Patented June 12, 1945

2,378,005

UNITED STATES PATENT OFFICE 2,378,005

PROCESS FOR TREATING FATS AND FATTY OILS

Eddy W. Eckey, Wyoming, Ohio, assignor to The Procter & Gamble Company, Cincinnati, Ohio, a corporation of Ohio No Drawing. Application November 10, 1941, Serial No. 418,591

15 Claims. (Cl. 260—410.7)

The present invention relates to triglyceride fats and oils, and more particularly to improvements in the process of rearranging the fatty acid radicals in the same whereby changes in composition and physical properties are effected.

It is an object of my invention to provide an improved process for bringing about changes in molecular structure of fatty compounds for the purpose of obtaining improved physical properties.

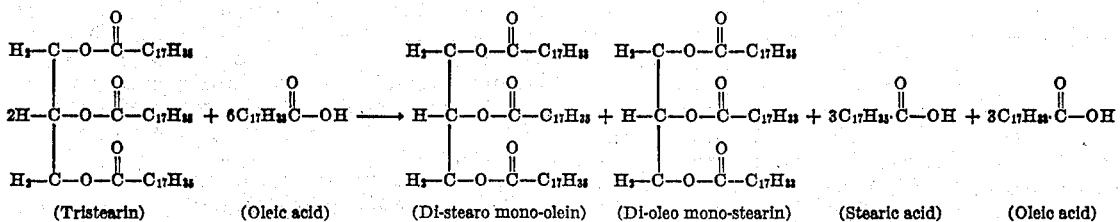

(Tristearin)　　(Oleic acid)　　(Di-stearo mono-olein)　　(Di-oleo mono-stearin)　　(Stearic acid)　　(Oleic acid)

A further object is to provide a new and improved catalyst for the reaction involving molecular change in fatty acid radicals in fats.

It is known that the molecular structure as evidenced by the properties of triglyceride fats and oils, hereafter referred to collectively as "fats," may be modified by heating the same at sufficiently high temperature with other triglycerides or with fatty acids of different properties. The reaction involved, however, proceeds slowly even at temperatures as high as 250° to 275° C., which are usually detrimental to most fats. Of course many catalysts have been proposed for accelerating the reaction and thereby permitting a material reduction in temperature which is advantageous not only because of the less severe conditions of treatment, but also because of the more economical heat requirements.

The catalysts heretofore proposed for speeding up the molecular rearrangement have consisted mainly of certain metal compounds and have met with some measure of success. However, they have the disadvantage of being difficult to remove from the oil where such removal is necessary before the fat can be used for human consumption.

I have discovered that water in small proportion is an excellent catalyst for the reaction under consideration, and that in contrast to catalysts heretofore employed it has the distinct advantage of being easily removed from the reaction mixture when its purpose has been served. Thus if a mixture of a triglyceride with free fatty acid of a kind not present in the fat, for example, a mixture of commercial tristearine and commercial oleic acid, is heated, as more fully hereinafter described, in the presence of a small amount of water under a pressure at least equal to the vapor pressure of the mixture of glyceride, fatty acid, and water at the temperature of treatment, the fatty radicals will readily interchange so that in the reacted mixture at equilibrium the glyceride portion will contain combined unsaturated acid in about the same proportion as it exists in the free fatty acid portion. Such a reaction may be most simply illustrated as follows:

Tristearin and triolein also would be formed, but as stated above at equilibrium the ratio of combined saturated to combined unsaturated acids will be about the same as the ratio of free saturated to free unsaturated acid.

Similarly, if a mixture of triglycerides having different properties, such as coconut oil and tristearine, are treated in a corresponding manner, rearrangement of the fatty radicals will take place and there will result a triglyceride mixture having distinctly different properties from the original mix.

In both cases the presence of a small amount of water will materially speed up the reaction and will make possible a corresponding reduction in reaction temperature with obvious advantages.

The water catalyst may also be employed in effecting a change in physical properties of a single fat such as coconut oil, palm oil, or the like during heat treatment.

My invention will be more clearly understood from the following specific examples, but of course these examples are merely illustrative of the manner in which the invention may be practiced and are not to be considered in any way as limiting the scope of the invention covered by the appended claims.

*Example 1.* The following mixture was prepared, the parts being by weight: 50 parts substantially completely hydrogenated cottonseed oil having an iodine value of 9.1 and a melting point of 142° F., 50 parts commercial oleic acid having an iodine value of 98.9, and two parts by weight of water. The combined ingredients were charged to a stainless steel reaction pressure vessel which, after closure, was immersed in an oil bath. The reaction mixture was then heated at a temperature of 225° C. for two hours. (Agitation may or may not be employed.)

At the end of the two-hour period, the contents of the vessel were cooled and then alkali refined by the Wesson neutral oil method as described by Jamieson and Baughman in Cotton Oil Press, vol. 6, No. 4, page 33 (1922), so as to obtain a substantially theoretical yield of neutral oil. This neutral oil representing the product of the rearrangement had an iodine value of 48.7 and a melting point of 123.8 as compared with 9.1 and 142 for the original triglyceride.

In order to accomplish the same degree of transformation in fat characteristics in a two-hour heating period without the use of water as a catalyst, it is necessary to conduct the reaction at 275° C., which is 50° C. higher than the temperature employed in carrying out Example 1.

While I have indicated in this example that the fatty acid may be removed by alkali refining, it is to be understood that this is an incidental step in the process and that I am not limited thereto. If removal is desired, it may be accomplished also by suitable distillation or it may be converted into triglyceride by esterification with glycerol in a known manner.

*Example 2.*—A mixture of 60 parts by weight of coconut oil and 40 parts by weight of substantially completely hydrogenated cottonseed oil and 10 parts by weight of water were charged to an autoclave similar to that employed in Example 1, and the contents heated at 235° to 240° C. for a period of one hour. Intermittent mechanical stirring was employed during the heating-up period. Following the heat treatment, the charge was cooled, removed from the autoclave and separated from the water. Of course a small amount of hydrolysis of the fat took place, with the accompanying formation of free fatty acid and free hydroxyl groups. By subsequently heating the fatty residue for about one-half hour at 260° C., the free hydroxyl groups were practically eliminated by esterification with the free fatty acid.

The finished rearranged fat mixture had a melting point of 106° F. as compared with 136° F. for the original physical mixture. Whereas this degree of rearrangement was accomplished in one hour at 235° to 240° C. when 10% water was present as catalyst, it required about 22 hours at 275° C. for the same degree of rearrangement in the absence of a catalyst.

The amount of catalyst which may be employed in accordance with my invention is not critical. In the following discussion the amounts given represent the amount present at the reaction temperature and pressure.

Amounts as small as 0.25 per cent are effective in speeding up the rate of fatty acid interchange, and amounts as high as fifteen per cent continue to show improved results over smaller quantities. My preferred range of usage is from about 0.25 per cent to about ten per cent. Some hydrolysis of glyceride with accompanying formation of free fatty acid and free hydroxyls will result and of course the amount of hydrolysis will be increasingly greater with increased water catalyst usage. Since the purpose of the invention is primarily to effect rearrangement of the fatty acid radicals in the triglyceride and not to effect hydrolysis thereof it is desirable that the amount of water be not substantially higher than 15 per cent.

This hydrolysis, however, is not detrimental to the ultimate result obtained in rearrangement.

If desirable the free fatty acid may be removed by alkali refining or distillation as indicated above, but ordinarily after rearrangement has progressed the desired dgeree, I prefer to reduce the pressure on the contents of the reaction vessel and permit the water to escape by boiling, then continue the heating of the residual charge so as to effect esterification of the free hydroxyls with free fatty acid.

It will be understood also that the process herein described is applicable to all natural fats and mixtures thereof.

The temperature at which the rearrangement is carried out in accordance with my process is not a limitation of the invention. While I prefer to conduct the heat treatment at the lowest possible temperature at which a suitable reaction rate will be obtained, for example 200° to 250° higher temperatures may of course be employed if the fat under treatment is not susceptible to thermal decomposition at the higher temperatures and if the amount of hydrolysis can be controlled.

I have indicated above that the reaction is conducted under pressure at least as high as the vapor pressure of the mixture containing the water catalyst. Obviously superatmospheric pressure is necessary in order that a sufficiently high reaction temperature can be obtained with the water present. While I find it convenient to merely conduct the reaction in a closed vessel and permit the pressure to build up due to the generation of steam from the water catalyst, higher pressures than those equal to the vapor pressure of the mixture containing the water catalyst may be employed without departing from the spirit of the invention.

The instant process is one which can be conducted in a batch manner by the use of a suitable pressure vessel or autoclave or in a continuous manner, for example, by pumping the mixture of materials through a suitable coil in which the desired pressure and temperature are maintained for a suitable length of time to effect the desired rearrangement. I consider that both come within the scope of my invention.

Having thus described my invention, what I claim and desire to secure by Letters Patent is:

1. In the process of effecting rearrangement of fatty acid radicals in a triglyceride mixture by heat treatment, the step of conducting the said heat treatment in the presence of between 0.25 per cent and 10 per cent water and under a pressure at least as great as the vapor pressure of the mixture containing the water.

2. The process of effecting rearrangement of fatty acid radicals in a mixture of triglycerides which comprises heating said mixture at a temperature above 200° C. in the presence of between 0.25 per cent and 10 per cent water and under a pressure at least as great as the vapor pressure of the mixture containing the water at the temperature of treatment.

3. The process of effecting rearrangement of fatty acid radicals in a triglyceride which comprises heating a mixture of triglyceride and free fatty acid at a temperature above 200° C. but below the temperature of thermal decomposition of the triglyceride and fatty acid in the presence of between 0.25 per cent and 10 per cent water and under a pressure at least as great as the vapor pressure of the mixture containing the water at the temperature of treatment.

4. In the process of effecting rearrangement of fatty acid radicals in a triglyceride mixture by heat treatment, the steps of conducting the said heat treatment in the presence of between 0.25 per cent and 10 per cent water and under a pressure at least as great as the vapor pressure of the mixture containing the water at the temperature of the heat treatment, releasing the pressure and boiling off the water.

5. In the process of effecting rearrangement of fatty acid radicals in a triglyceride mixture by heat treatment, the steps of conducting the said heat treatment in the presence of between 0.25 per cent and 10 per cent water and under a pressure at least as great as the vapor pressure of the mixture containing the water and of reducing the content of free fatty acid developed during the heat treatment.

6. In the process of effecting rearrangement of fatty acid radicals in a triglyceride mixture by heat treatment, the steps of conducting the said heat treatment in the presence of between 0.25 per cent and 10 per cent water and under a pressure at least as great as the vapor pressure of the mixture containing the water at the temperature of the heat treatment, releasing the pressure, boiling off the water and continuing the heat treatment so as to effect esterification of hydroxyl groups with free fatty acid produced as by-products.

7. In the process of effecting rearrangement of fatty acid radicals in a triglyceride mixture by heat treatment, the steps of conducting the said heat treatment in the presence of between 0.25 per cent and 10 per cent water and under a pressure at least as great as the vapor pressure of the mixture containing the water at the temperature of heat treatment, and after the desired rearrangement has been effected, continuing heating at a lower pressure thereby removing the water catalyst.

8. In the process of effecting rearrangement of fatty acid radicals in a triglyceride mixture by heat treatment, the steps of conducting the said heat treatment in the presence of between 0.25 per cent and 10 per cent water and under a pressure at least as great as the vapor pressure of the mixture containing the water at the temperature of heat treatment, and after the desired rearrangement has been effected, continuing heating at a lower pressure thereby removing the water catalyst and simultaneously esterifying free hydroxyl groups with free fatty acid produced as by-products in the rearrangement treatment.

9. In the process of effecting rearrangement of fatty acid radicals in a triglyceride by heat treatment, the steps of heating a mixture of said triglyceride and fatty acid in the presence of between 0.25 per cent and 10 per cent water and under a pressure at least as great as the vapor pressure of the mixture containing the water at the temperature of the heat treatment, and substantially removing the free fatty acid.

10. In the process of effecting rearrangement of fatty acid radicals in a triglyceride by heat treatment, the steps of heating a mixture of said triglyceride and fatty acid in the presence of between 0.25 per cent and 10 per cent water and under a pressure at least as great as the vapor pressure of the mixture containing the water at the temperature of the heat treatment, and subsequently distilling free fatty acid from the mixture.

11. In the process of effecting rearrangement of fatty acid radicals in a triglyceride by heat treatment, the steps of heating a mixture of said triglyceride and fatty acid in the presence of between 0.25 per cent and 10 per cent water and under a pressure at least as great as the vapor pressure of the mixture containing the water at the temperature of the heat treatment, and subsequently removing free fatty acid by alkali refining.

12. In the process of effecting rearrangement of fatty acid radicals in a triglyceride by heat treatment, the step which comprises heating a mixture of triglyceride and free fatty acid at rearrangement temperature in the presence of water in amount between 0.25 per cent and 10 per cent of the weight of said mixture, and under a pressure at least as great as the vapor pressure of the mixture containing the water at the temperature of treatment.

13. In the process of effecting rearrangement of fatty acid radicals in a mixture of glycerides by heat treatment, the step which comprises heating said mixture at rearrangement temperature in the presence of water in amount between 0.25 per cent and 10 per cent of the weight of said mixture, and under a pressure at least as great as the vapor pressure of the mixture containing water at the temperature of treatment.

14. In the process of effecting rearrangement of fatty acid radicals in a natural triglyceride fat by heat treatment, the step which comprises heating said triglyceride fat at rearrangement temperature in the presence of water in amount between 0.25 per cent and 10 per cent by weight of said triglyceride fat, and under pressure at least as great as the vapor pressure of the mixture of triglyceride fat and water at the temperature of treatment.

15. In the process of effecting rearrangement of fatty radicals in a triglyceride by heat treatment, the steps of heating a triglyceride mixture at rearrangement temperature in the presence of water in amount between 0.25 per cent and 10 per cent by weight of said triglyceride mixture, and under a pressure at least as great as the vapor pressure of the mixture containing the water at the temperature of treatment, and subjecting the mixture to alkali refining.

EDDY W. ECKEY.